United States Patent
Silverstein et al.

(10) Patent No.: US 11,165,725 B1
(45) Date of Patent: Nov. 2, 2021

(54) MESSAGING IN A REAL-TIME CHAT DISCOURSE BASED ON EMOTIVE CUES

(71) Applicant: International Business Machines Corporation, Armonk, NY (US)

(72) Inventors: Zachary A. Silverstein, Jacksonville, FL (US); Kelley Anders, East New Market, MD (US); Jonathan D. Dunne, Dungarvan (IE); Liam S. Harpur, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/985,801

(22) Filed: Aug. 5, 2020

(51) Int. Cl.
H04L 12/58 (2006.01)
H04L 29/08 (2006.01)

(52) U.S. Cl.
CPC .............. *H04L 51/02* (2013.01); *H04L 51/04* (2013.01); *H04L 67/22* (2013.01); *H04L 67/306* (2013.01)

(58) Field of Classification Search
CPC ....... H04L 51/02; H04L 51/04; H04L 67/306; H04L 67/22
See application file for complete search history.

(56) References Cited

U.S. PATENT DOCUMENTS

| | | | |
|---|---|---|---|
| 9,704,097 B2 | 7/2017 | Devarajan | |
| 10,171,659 B2 | 1/2019 | Riahi | |
| 10,594,757 B1 * | 3/2020 | Shevchenko | .......... H04L 65/605 |
| 10,984,496 B1 * | 4/2021 | Rabb | ..................... G06Q 50/265 |
| 2014/0058721 A1 | 2/2014 | Becerra | |
| 2016/0300570 A1 | 10/2016 | Gustafson | |
| 2016/0350651 A1 | 12/2016 | Devarajan | |
| 2017/0026254 A1 * | 1/2017 | Adylov | .................... H04L 51/16 |
| 2018/0109482 A1 * | 4/2018 | DeLuca | .................. H04L 51/08 |
| 2019/0266185 A1 * | 8/2019 | Rao | ..................... H04N 21/4661 |
| 2019/0273767 A1 | 9/2019 | Nelson | |
| 2020/0059375 A1 * | 2/2020 | Hewitt | ................ H04L 12/1831 |
| 2020/0114521 A1 * | 4/2020 | Mahoor | ................. B25J 9/1697 |

(Continued)

OTHER PUBLICATIONS

MC Duff et al., "Designing emotionally sentient agents", Communications of the ACM, Dec. 2018, vol. 61, No. 12, 10 pps., <https://dl.acm.org/citation.cfm?id=3186591>.

(Continued)

*Primary Examiner* — Michael Won
(74) *Attorney, Agent, or Firm* — Alexander G. Jochym

(57) ABSTRACT

Aspects of the present invention disclose a method, computer program product, and system for generating messages in a real-time chat discourse. The method includes one or more processors identifying user profile data associated with a user engaged in a real-time chat discourse with a chatbot. The method further includes one or more processors analyzing the real-time chat discourse between the user and the chatbot. The method further includes one or more processors determining a baseline emotive level for the real-time chat discourse based on the user profile data and the analysis of the real-time chat discourse. The method further includes one or more processors determining real-time emotion information of messages of the user in the real-time chat discourse. The method further includes one or more processors determining whether the real-time emotion information deviates from the determined baseline emotive level.

20 Claims, 4 Drawing Sheets

(56) References Cited

U.S. PATENT DOCUMENTS

2020/0177403 A1\* 6/2020 Vazquez-Rivera .... G06Q 10/10
2020/0226217 A1\* 7/2020 Anders .................. G06F 40/30

OTHER PUBLICATIONS

Wang et al., "Predicting Thread Discourse Structure over Technical Web Forums", Proceedings of the 2011 Conference on Empirical Methods in Natural Language Processing, pp. 13-25, Edinburgh, Scotland, UK, Jul. 27-31, 2011, <https://www.aclweb.org/anthology/D11-1002>.

Welch, "Google's new Currents app is its enterprise replacement for Google+", Apr. 10, 2019, 3 pps., <https://www.theverge.com/2019/4/10/18305023/google-currents-replaces-plus-g-suite-new-app>.

\* cited by examiner

USER A — 310

I WOULD LIKE TO GET SOME HELP FILLING OUT THIS FORM TO CLAIM DOMICILIARY CASE ALLOWANCE FOR MY MOTHER?

JOY = 0.4, ANGER = 0.14, DISGUST = 0.03, SADNESS = 0.22, FEAR = 0.05 } 315

CHATBOT — 320

CERTAINLY MEREDITH. HOW CAN I HELP YOU?

USER A — 330

WELL ON PAGE FIVE IT ASKS ABOUT INSURANCE COVER AND THE THRESHOLD FOR APPROVAL. AS THERE ARE SO MANY FIELDS TO FILL IN I AM EXTREMELY WORRIED ABOUT MAKING SURE I FILL IN THE FORM CORRECTLY

JOY = 0.07, ANGER = 0.22, DISGUST = 0.02, SADNESS = 0.36, FEAR = 0.43 } 335

CHATBOT — 340

THERE IS NO NEED TO WORRY, WE GET THESE QUESTIONS ALL THE TIME. IN FACT, WE CAN SEND YOU A TEMPLATE TO HELP YOU COMPLETE YOUR FORM WITH EASE.

USER A — 350

OH THAT WOULD BE VERY HELPFUL. MANY THANKS.

JOY = 0.68, ANGER = 0.05, DISGUST = 0.02, SADNESS = 0.12, FEAR = 0.01 } 355

MESSAGING IN A REAL-TIME CHAT DISCOURSE BASED ON EMOTIVE CUES

BACKGROUND OF THE INVENTION

The present invention relates generally to the field of messaging, and more particularly to real-time chat messaging.

Messaging applications (e.g., social messaging, chat applications, etc.) are applications and platforms that enable messaging on the Internet on a broad array of platforms. Messaging applications exist for social networking platforms or other instant messaging services, and also are developed for specific uses, such as chatbots, payments, e-commerce chats, etc. Messaging applications are some of the most widely utilized applications for smartphones.

A dialogue system, or conversational agent (CA), is a computer system intended to converse with a human. Dialogue systems employed one or more of text, speech, graphics, haptics, gestures, and other modes for communication on both the input and output channel. A chatbot is a piece of software that conducts a conversation via auditory or textual methods. Such programs are often designed to convincingly simulate how a human would behave as a conversational partner. Chatbots are typically used in dialog systems for various practical purposes including customer service or information acquisition. Some chatbots use sophisticated natural language processing (NLP) systems, while others can utilize more simple methods (e.g., responses based on keyword identification, etc.). Many banks, insurers, media companies, e-commerce companies, airlines, hotel chains, retailers, health care providers, government entities and restaurant chains have used chatbots to answer simple questions, increase customer engagement, for promotion, and to offer additional ways to order products or services, etc. Many companies' chatbots run on messaging apps or via short message service (SMS).

SUMMARY

Aspects of the present invention disclose a method, computer program product, and system for generating messages in a real-time chat discourse. The method includes one or more processors identifying user profile data associated with a user engaged in a real-time chat discourse with a chatbot. The method further includes one or more processors analyzing the real-time chat discourse between the user and the chatbot. The method further includes one or more processors determining a baseline emotive level for the real-time chat discourse based on the user profile data and the analysis of the real-time chat discourse. The method further includes one or more processors determining real-time emotion information of messages of the user in the real-time chat discourse. The method further includes one or more processors determining whether the real-time emotion information deviates from the determined baseline emotive level.

In a further aspect, the method includes, in response to determining that the real-time emotion information deviates from the determined baseline emotive level, one or more processors generating a chat message based on a change of the real-time emotion information relative to the determined baseline emotive level.

BRIEF DESCRIPTION OF THE DRAWINGS

FIG. 3 depicts an example chat session between a user and a chatbot, in accordance with embodiments of the present invention.

DETAILED DESCRIPTION

Embodiments of the present invention allow for managing messaging in a real-time chat discourse. Various embodiments of the present invention analyze a real-time chat discourse, using corpus linguistic analytics and information associated with user in the chat discourse, to determine real-time emotion information of the chart discourse. Based on comparing the real-time emotion information to a baseline emotive level for the chat discourse, embodiments of the present invention can determine whether the chat discourse deviates from expected emotive levels (i.e., the baseline). In response to determining that the real-time emotion information indicates a deviation from the baseline, embodiments of the present invention generate and send a message to the user in the discourse. The message is tailored to the real-time emotion information is generated to align future messaging in the chat discourse toward the baseline.

Some embodiments of the present invention recognize that messaging systems (e.g., chatbots) that can respond to cues from the user (e.g., social, emotional, etc.) provide an improved interactive experience and an overall improvement for the messaging system and platform, enabling the underlying computer systems to perform complex tasks in a more positive and efficient manner. In addition, embodiments of the present invention recognize the difficulty in creating and providing a messaging system that is capable of determining emotional signals in a chat and reacting accordingly. Further, embodiments of the present invention recognize that a significant variability can exist across the users of a messaging system.

Accordingly, embodiments of the present invention provide a system that incorporates the determination and use of emotive cues in a real-time chat discourse. For example, determining emotive cues of a user a real-time chat discourse in a messaging system between a chatbot the user.

Implementation of embodiments of the invention may take a variety of forms, and exemplary implementation details are discussed subsequently with reference to the Figures.

Figure 1:
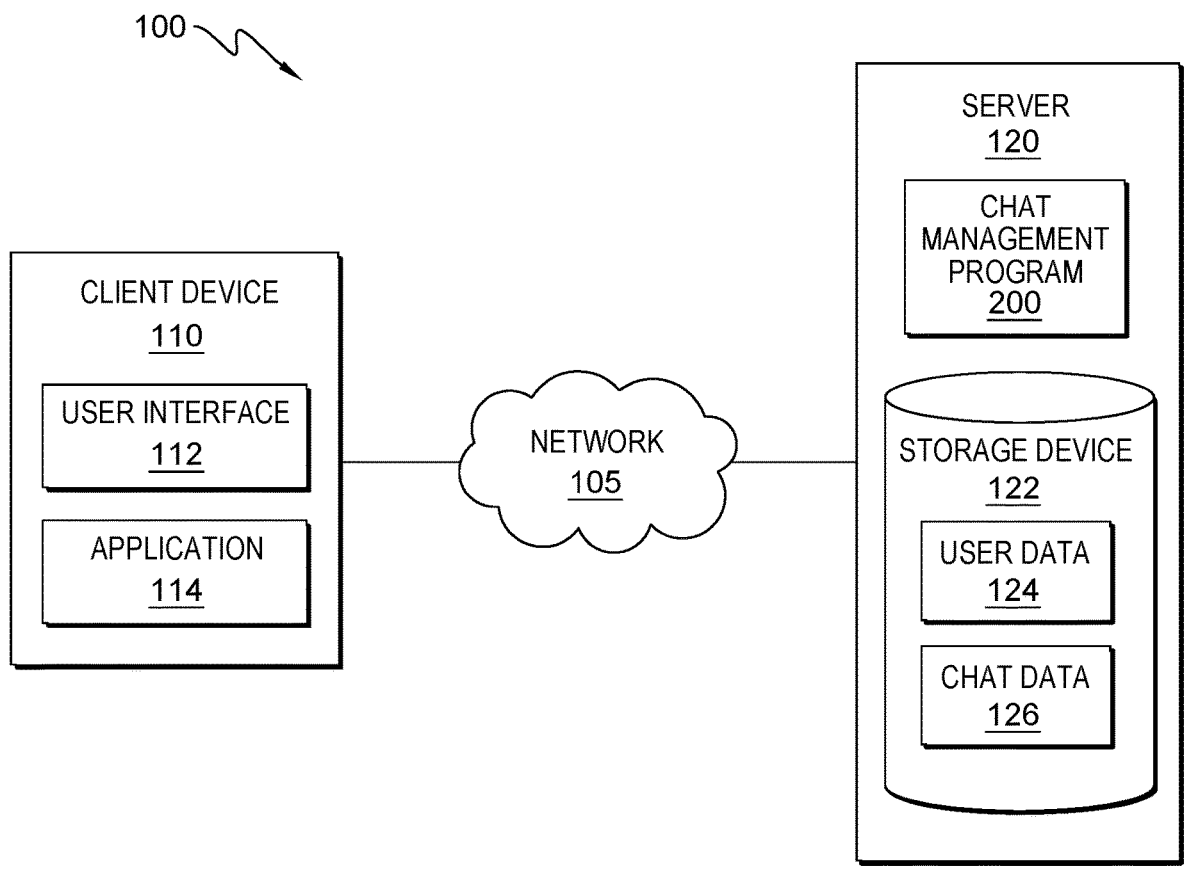
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes computing device 110 and server 120, interconnected over network 105. In an example embodiment, computing device 110 is representative of a computing device that a user utilizes to access a messaging platform associated with server 120. For example, a user of client device 110 sends a message, via network 105, in a message platform that server 120 services (e.g., hosts/manages chatbots of the messaging platform, etc.). In this example, server 120 manages interactions of messages to the user (e.g., in the messaging platform, utilizing chat management program 200), in accordance with embodiments of the present invention. In other embodiments, data processing environment 100 can include additional instances of computing devices (not shown) that access and utilize the messaging platform associated with server 120.

Network 105 can be, for example, a local area network (LAN), a telecommunications network, a wide area network (WAN), such as the Internet, or any combination of the three, and include wired, wireless, or fiber optic connections. In general, network 105 can be any combination of connections and protocols that will support communications between computing device 110 and server 120, in accordance with embodiments of the present invention. In various embodiments, network 105 facilitates communication among a plurality of networked computing devices (e.g., client device 110, other computing devices (not shown), server 120), corresponding users (e.g., users of computing device 110 or server 120, etc.), and corresponding management services (e.g., server 120).

In various embodiments of the present invention, computing device 110 may be a workstation, personal computer, personal digital assistant, mobile phone, or any other device capable of executing computer readable program instructions, in accordance with embodiments of the present invention. In general, computing device 110 is representative of any electronic device or combination of electronic devices capable of executing computer readable program instructions. Computing device 110 may include components as depicted and described in further detail with respect to FIG. 4, in accordance with embodiments of the present invention. In an example embodiment, computing device 110 is a personal workstation or mobile device associated with (e.g., registered to) a user that is utilizing the messaging platform associated with server 120, in accordance with embodiments of the present invention.

Computing device 110 includes user interface 112 and application 114. User interface 112 is a program that provides an interface between a user of computing device 110 and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on computing device 110. In various example embodiments, application 114 can be an application that a user of computing device 110 utilizes to establish a communication channel with the messaging platform associated with server 120 (e.g., a web browser, enterprise-specific messaging application, social media application, etc.). For example, application 114 is a web browser that the user of computing device 110 utilizes to initiate a chat session with a customer support chatbot (i.e., in the messaging platform associated with server 120.

In example embodiments, server 120 can be a desktop computer, a computer server, or any other computer systems, known in the art. In certain embodiments, server 120 represents computer systems utilizing clustered computers and components (e.g., database server computers, application server computers, etc.) that act as a single pool of seamless resources when accessed by elements of data processing environment 100 (e.g., computing device 110, other devices not shown). In general, server 120 is representative of any electronic device or combination of electronic devices capable of executing computer readable program instructions. Server 120 may include components as depicted and described in further detail with respect to FIG. 4, in accordance with embodiments of the present invention.

Server 120 includes chat management program 200 and storage device 122, which includes user data 124 and chat data 126. In various embodiments of the present invention, server 120 operates as a computing system that hosts and/or manages an Internet messaging platform and corresponding chatbots, also utilizing processing capabilities of chat management program 200. In an example embodiment, server 120 is associated with an enterprise or service provider (e.g., e-commerce platform, messaging service, customer support platform, etc.) that interacts with users (e.g., user of computing device 110) via chatbots through a messaging service.

In example embodiments, chat management program 200 generates messages in a real-time chat discourse based on emotion information of users, in accordance with embodiments of the present invention. Chat management program 200 can operate to facilitate an improved interaction between at least one user and a chatbot in a messaging session. In various embodiments, chat management program 200 analyzes user information and content of a real-time chat discourse and determines a baseline emotive level for the chat discourse. Chat management program 200 can determine whether real-time emotion information of the content of messages in the chat discourse indicates a deviation from the emotive baseline. In response to determining that the chat discourse is deviating form the emotive baseline, chat management program 200 generates a chat message (for the chatbot to send to the user in the messaging session) intended to realign the content of the messages from the user back toward the emotive baseline of the chat discourse.

In additional embodiments, server 120 utilizes storage device 122 to store information associated with users (e.g., user of computing device 110) in messaging sessions and historical information derived from messaging sessions. For example, storage device 122 stores user data 124 and chat data 126. Storage device 122 can be implemented with any type of storage device, for example, persistent storage 405, which is capable of storing data that may be accessed and utilized by server 120 and computing device 110, such as a database server, a hard disk drive, or a flash memory. In other embodiments, storage device 122 can represent multiple storage devices and collections of data within server 120.

In various embodiments of the present invention, the user of computing device 110 can register with server 120 (e.g., via a corresponding application, such as application 114). For example, the user completes a registration process, provides information, and authorizes the collection and analysis (i.e., opts-in) of relevant data on at identified computing devices, (e.g., computing device 110), by server 120 (e.g., via chat management program 200). In various embodiments, a user can opt-in or opt-out of certain categories of data collection. For example, the user can opt-in to provide all requested information, a subset of requested information, or no information. In one example scenario, the user opts-in to provide time-based information, but opts-out of providing location-based information (on all or a subset of computing devices associated with the user). In another embodiment, the user can define which forms of data that server 120 can utilize in determining emotional information (for chat management program 200).

In alternate embodiments, the user can opt out of the determination and/or analysis of emotional information entirely. In such embodiments, the user can interact with chatbots in the messaging session normally (i.e., without assistance/interaction with chat management program 200). Server 120 can store such a preference in user data 122, associated with the corresponding user.

In example embodiments, user data 124 is representative of aggregated data associated with users of a messaging platform, stored within storage device 122. In an example scenario, user data 124 includes information associated with a user of computing device 110 (e.g., a user profile). In various embodiments, user data 124 can include information provided by the user of computing device 110 (e.g., during a registration process, etc.), information derived from the user of computing device 110 interacting with a chatbot in one or more chat discourses (e.g., derived through iterations of chat management program 200), etc. In additional embodiments, user data 124 can include a post/message history for the user of computing device 110. In further aspects, chat management program 200 can access and utilize information in user data 124, during a real-time chat discourse, in accordance with embodiments of the present invention.

In another embodiment, chat data 126 is representative aggregated data associated with messaging sessions (i.e., chat discourses between user and chatbots) on a messaging platform, stored within storage device 122. In an example scenario, chat data 126 includes information associated with a chat discourse between a user of computing device 110 and a chatbot. In this example scenario, chat data 126 includes a message history, chat topic, a baseline emotive level (derived by chat management program 200) for the real-time chat discourse, determined real-time emotion information for the chat discourse (by chat management program 200), chatbot responses generated (by chat management program 200) based on the real-time emotion information, emotion response of the user to the chatbot responses, and other metrics relevant to the chat discourse and/or chat management program 200. In further embodiments, chat management program 200 stored information in chat data 126 in response to concluding a messaging session. In another aspect, chat management program 200 can access and utilize information in chat data 126, during a real-time chat discourse, in accordance with embodiments of the present invention.

In an example embodiment, the user of computing device 110, utilizing application 114, establishes a chat messaging session (e.g., with a chatbot) in the messaging platform associated with server 120. In this example embodiments, server 120 (e.g., utilizing chat management program 200) facilitates interactions between the user and the chatbot of the chat messaging session. FIG. 3 depicts example chat session 300 between the user of computing device 110 (i.e., user A) and a chatbot (managed/operated by server 120), in accordance with various embodiments of the present invention. Example chat session 300 depicts a sample interaction between user A and a chatbot, which includes message 310, message 330, and message 350 from user A, and reply 320 and reply 340 from the chatbot.

In additional aspects, example chat session 300 includes emotional information 370, which includes emotion levels 315, emotion levels 335, and emotion levels 355. Emotion information 370 can be illustrative of information that chat management program 200 determines during operation, but does not present to user A (i.e., background data for use in processing), in accordance with embodiments of the present invention. In example embodiments, chat management program 200 determines real-time emotion information for the chat discourse between user A and the chatbot. For example, emotion levels 315 corresponds to message 310, emotion levels 335 corresponds to message 330, and emotion levels 355 corresponds to message 350.

Figure 2:
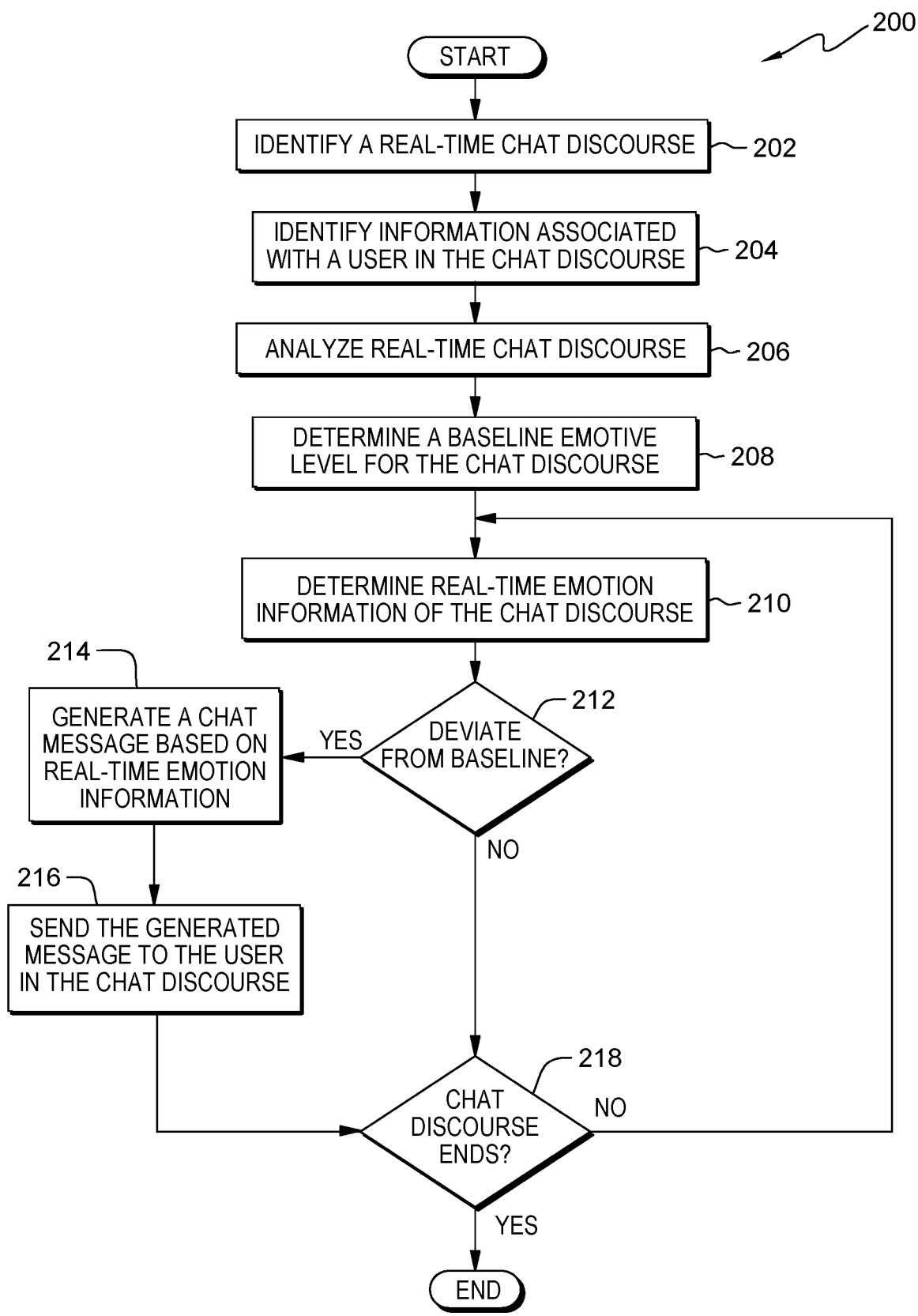
FIG. 2 is a flowchart depicting operational steps of a program for generating messages in a real-time chat discourse based on emotion information of users, in accordance with embodiments of the present invention.

FIG. 2 is a flowchart depicting operational steps of chat management program 200, a program for generating messages in a real-time chat discourse based on emotion information of users, in accordance with an embodiment of the present invention. In one embodiment, chat management program 200 initiates in response to a user (e.g., a user of computing device 110) initiating a chat discourse with chatbot (e.g., example chat session 300). In another embodiment, chat management program 200 operates concurrently with a chat session hosted on and/or managed by server 120 (e.g., as background application software). In various embodiments, chat management program 200 can iterate in response to new messages and/or interactions between a user and a chatbot in a monitored chat discourse.

In step 202, chat management program 200 identifies a real-time chat discourse. In one embodiment, chat management program 200 identifies a user (e.g., user of computing device 110) participating in a chat discourse with a chatbot on a messaging platform associated with server 120. In other embodiments, chat management program 200 can determine that a user is interacting with another user in a char discourse (e.g., the user of computing device 110 is interacting with a customer service representative in a chat discourse on a messaging platform).

FIG. 3 depicts example chat session 300 between the user of computing device 110 (i.e., user A) and a chatbot (managed/operated by server 120), in accordance with various embodiments of the present invention. In example embodiments, chat management program 200 identifies that the user of computing device initiates the real-time chat discourse depicted in example chat session 300. In additional example embodiments, chat management program 200 identifies that the user provides input (e.g., sending a message, makes a selection, etc.) in an existing chat discourse. In various embodiments, a chat discourse can be any messaging interaction between a user (e.g., a user of computing device 110) and another entity on a messaging platform (e.g., a chatbot, another user, such as a customer service representative, etc.).

In step 204, chat management program 200 identifies information associated with a user in the chat discourse. In one embodiment, chat management program 200 identifies information associated with the user of computing device 110. Chat management program 200 can utilize information in user data 124 that is associated with the user in the chat discourse. For example, user data 124 includes a user profile for the user of computing device 110. In various embodiments, user data 124 can include information provided by the user of computing device 110 (e.g., during a registration process, etc.), information derived from the user of computing device 110 interacting with a chatbot in one or more chat discourses (e.g., derived through iterations of chat management program 200), etc.

For example, the user of computing device 110 can register with server 120 (or the messaging platform) and provide preferences, demographic information, etc., for inclusion in a user profile of user data 124. In additional embodiments, user data 124 can include a post/message history for the user of computing device 110. In additional embodiments, the user of computing device 110 defines which data is included in user data 124 (e.g., opting-in and/or opting-out to various forms of data collection) and which data that chat management program 200 can access and utilize. For example, the user can define preferences that indicate how the post history for the user is saved in user data 124, user profile data that chat management program 200 can utilize, etc.

In step 206, chat management program 200 analyzes the real-time chat discourse. In one embodiment, chat management program 200 analyzes the chat discourse between the user of computing device 110 and the chatbot utilizing corpus linguistic methods. In example embodiments, chat management program 200 analyzes the chat discourse between the user and the chatbot in real-time during operation of the chat session. For example, chat management program 200 can perform an emotive development analysis on messages in the chat discourse, a chatbot interaction profile, development of the conversation in the chat discourse, or other relevant available analysis techniques, in accordance with various embodiments of the present invention.

In additional embodiments, chat management program 200 analyzes the real-time chat discourse through analyzing the emotive development of the chat discourse and the chatbot chat interaction velocity within the chat discourse. In another example embodiment, chat management program 200 determines information associated with the chatbot in the chat discourse (e.g., chatbot type, default interaction profile, associated topics and/or categories, etc.). In further embodiments, chat management program 200 can identify information associated with a user in the chat discourse (step 204) concurrently, or subsequent to, analyzing the real-time chat discourse (step 206).

In step 208, chat management program 200 determines a baseline emotive level for the chat discourse. In one embodiment, chat management program 200 determines a baseline emotive level based on the identified user information (from step 204) and the analysis of the real-time chat discourse (step 206). In additional embodiments, chat management program 200 can take into account types and/or topics of the chat discourse (e.g., topics and categories assigned by the messaging platform). In various embodiments, chat management program 200 establishes the baseline emotive level as a reference point of emotion information (e.g., scores) in the chat discourse that chat management program 200 can utilize as a comparison point for emotional information derived from messages by the user (of computing device 110) as the chat discourse progresses.

In example embodiments, chat management program 200 determines the baseline emotive level based on one or more emotion categories. In the example depicted with regard to FIG. 3, chat management program 200 utilizes the emotion categories of "Joy, Anger, Disgust, Sadness, and Fear." In other embodiments, chat management program 200 can utilize other emotion categories (not shown) derived through an emotional analysis of the chat discourse, in accordance with embodiments of the present invention. Further, chat management program 200 can utilize a subset of the five emotion categories depicted in FIG. 3. In various embodiments, chat management program 200 can utilize ratings/scores for one or more emotional categories (e.g., one or more of Joy, Anger, Disgust, Sadness, and Fear) as the emotive baseline. In other embodiments, chat management program 200 can utilize a sum of a plurality of ratings/scores for emotional categories as (e.g., a sum of scores for the emotional categories of Joy, Anger, Disgust, Sadness, and Fear) as the emotive baseline.

Chat management program 200 can determine the baseline emotive level for the chat discourse to be various different metrices, based on an analysis of user data and an analysis of the chat discourse, in accordance with embodiments of the present invention. In an example scenario, chat management program 200 can utilize a predefined baseline emotive level (e.g., defined by user preferences in user data 124, defined by the messaging platform, associated with a topic assigned to the chat discourse, etc.).

In another example scenario, chat management program 200 can utilize emotional information from a particular point in the chat discourse as the emotive baseline. For example, chat management program 200 can utilize emotional information corresponding to a message from a user that starts a chat discourse, such as message 310 from user A in example chat session 300. In this example, chat management program 200 determines the emotion scores in emotion levels 315 of emotion information 370 to be the emotive baseline of the chat session. In another aspect of this example, chat management program 200 can determine the emotive baseline level as the sum of the emotion scores for emotion levels 315 (i.e., a cumulative score of 0.48). In a further example, chat management program 200 determines the baseline emotive level as an indication of whether, based on emotional analysis of a message, emotion categories are present in an initiating message of the chat discourse (e.g., whether a message indicates one or more of Joy, Anger, Disgust, Sadness, and Fear, as a "yes" or "no" indicator).

In step 210, chat management program 200 determines real-time emotion information of the chat discourse. In one embodiment, chat management program 200 determines, for one or more messages in a chat discourse, scores for emotional categories based on the content of the one or more messages. In an example embodiment, chat management program 200, for messages from the user of computing device 110 in the chat discourse, determines ratings/scores for the emotional categories of Joy, Anger, Disgust, Sadness, and Fear. In various embodiments, chat management program 200 utilizes corpus linguistic analysis on message text of the chat discourse, text analysis (e.g., natural language processing, NLP, etc.), a user posting frequency, content and emotional information of previous messages (chat interaction velocity), etc., to determine the real-time emotion information for the chat discourse.

In additional embodiments, chat management program 200 can determine real-time emotion information for messages from the user of computing device 110 as the user inputs them messages into the chat discourse. In an example scenario, chat management program 200 determines emotion information scores for each word or phrase in messages from the user in the chat discourse. In another example scenario, chat management program 200 determines an overall emotion information score for the messages input the user in the chat discourse. In one embodiment, chat management program 200 can determine emotional information scores as a numerical score based on the emotion analysis. In another embodiment, chat management program 200 can determine the emotion information score as an indication of whether or not an emotion category is present (i.e., a "yes" or "no" indication of whether Joy, Anger, Disgust, Sadness, and Fear is present).

In the example of example chat session 300 (depicted in FIG. 3), chat management program 200 determines emotion information 370 in real time. In this example, chat management program 200 utilizes emotion levels 315 (corresponding to the initial message from user A) as the baseline emotive level (step 208). Chat management program 200 can then determine emotion levels 335 for message 330 and emotion levels 355 for message 350, as real-time emotion information as user A posts message 330 and message 335 in example chat session 300. Accordingly, FIG. 3 depicts example scored for the emotional categories of Joy, Anger, Disgust, Sadness, and Fear, in accordance with various embodiments of the present invention.

In step decision 212, chat management program 200 determines whether the real-time emotion information deviates from the baseline. In one embodiment, chat management program 200 determines whether the real-time emotion information (from step 210) deviates from the baseline emotive level (from step 208). In an example embodiment, chat management program 200 determines the distance (i.e., amount of change) between the real-time emotion information and the baseline emotive level. Chat management program 200 can utilize a defined threshold distance value to determine whether the real-time emotion information in the chat discourse deviates from the baseline.

In an example embodiment, chat management program 200 can utilize a defined threshold value that is based on a topic assigned to the chat discourse. For example, a distance threshold value associated with the "Finance" topic can be different than a threshold value associated with the "Shipping" topic. In various embodiments, chat management program 200 can utilize a customized threshold value for each emotion category, a threshold value that applies to all or a subset of the emotion categories, or a combination thereof.

In an additional embodiment, chat management program 200 can utilize a percentage value as the distance threshold. For example, chat management program 200 determines whether the real-time emotion information indicates more than a 50% increase or decrease (depending on the category) in an emotion score for an emotion category (i.e., an amount of change from the baseline). In a further embodiment, chat management program 200 can determine whether an emotion of an emotion category is present in a message but was not present in the baseline. For example, chat management program 200 determines whether the emotion of "Disgust" is present in a new message but was not present the baseline emotive level.

In step 214, chat management program 200 generates a chat message based on real-time emotion information. More specifically, in response to determining that the real-time emotion information deviates from the baseline (decision step 212, YES branch), chat management program 200 generates a chat message based on the real-time emotion information (step 214). In example embodiments, in place of standard operations for the chatbot, chat management program 200 generates a message for the chatbot to send to the user in the chat discourse that is designed to realign the content of the chat discourse toward the baseline emotive level. For example, chat management program 200 generates a message that is focused on reversing a negative emotion trend in the determined real-time emotion information of the user of computing device 110.

Chatbots often selects and/or assemble replies for a chat discourse from a repository of messages and/or message segments. In various embodiments, the messages and message segments can base associated with emotion information indicating a historical positive/negative effect on emotion categories. Accordingly, chat management program 200 (in step 214) can select a message, or generate a message from message segments (e.g., assemble a message), based on the emotion information that has deviated from the baseline (from decision step 212). In another embodiment, chat management program 200 can generate a message by substituting words or phrases in an existing message with words or phrases that are designed to assuage one or more emotions that have deviated from the baseline.

In the example of example chat session 300 (depicted in FIG. 3), chat management program 200 receives message 330 from user A and determines emotion levels 335 corresponding to message 330 (in step 210). In response to determining that emotion levels 335 deviates from the baseline emotive level (e.g., an increase in Fear and Sadness scores relative emotion levels 315 that exceeds a deviation threshold) (decision step 212, YES branch), chat management program 200 generates reply 340. In an example scenario, chat management program 200 generates reply 340 based on identifying one or more message segments in a repository of the chatbot (in step 214). In this example scenario, chat management program 200 utilizes message segments that are associated with an expected decrease in Fear and/or Sadness of user A.

In another example scenario, chat management program 200 generates reply 340 by identifying a reply (e.g., a template reply, existing reply message, message segment, etc.) and adding and/or substituting words or phrases that are associated with an expected decrease in Fear and/or Sadness of user A. For example, chat management program 200 determines to add the phrase "There is no need to worry, we get these questions all the time" to assuage the increase in the Fear emotion score. In additional embodiments, chat management program 200 utilizes the product of discourse and emotive analysis to infer an amount/level of alignment to reverse a negative trend in the interaction between a user and a chatbot. Chat management program 200 can generate messages to mitigate negative trends in one or more of the utilizes emotion categories (e.g., Joy, Anger, Disgust, Sadness, and Fear), in accordance with various embodiments of the present invention.

In step 216, chat management program 200 sends the generated message to the user in the chat discourse. In one embodiment, chat management program 200 sends one or more messages (generated in step 214) to the user of computing device 110 in the chat discourse. In the example of example chat session 300 (depicted in FIG. 3), chat management program 200 generates reply 340 (in step 214) based on emotion levels 335 deviating from the baseline and sends reply 340 as a message in the discourse with user A (in step 216). Further, as depicted in example chat session 300, reply 340 results in user A sending message 350. Message 350 corresponds to emotion levels 355, which indicate a decrease in the Fear and Sadness categories of emotion levels. In an alternate embodiment, chat management program 200 sends the generated message to a human user (e.g., customer service representative, i.e., not a chatbot) for the human user to send as a reply in the chat discourse.

In decision step 218, chat management program 200 determines whether the chat discourse ends. More specifically, in response to determining that the real-time emotion information does not deviate from the baseline (decision step 212, NO branch), chat management program 200 determines whether the chat discourse has ended (decision step 218). In another embodiment, in response to sending the generated message to the user in the chat discourse (step 216), chat management program 200 determines whether the chat discourse has ended (decision step 218). In a further embodiment, chat management program 200 constantly monitors whether the chat discourse is active.

In response to determining that the chat discourse has not ended (decision step 218, NO branch), chat management program 200 determines real-time emotion information of the chat discourse (return to step 210). In example embodiments, if the chat discourse is still active, then chat management program 200 continues to generate real-time emotion information in response to receiving new messages (from the user of computing device 110) in the chat discourse. In a further embodiment, in response to determining that the real-time emotion information does not deviate from the baseline (decision step 212, NO branch) and then determining that the chat discourse has not ended (decision step 218, NO branch), chat management program 200 instructs the chatbot to continue normal operating procedures (i.e., no change based on derived real-time emotion information).

Alternatively, in response to determining that the chat discourse has ended (decision step 218, YES branch), chat management program 200 ends. In additional aspects, chat management program 200 can derive insights for improving the domain behavior for emotional analysis and then can generalize and store the derived insights for future use (e.g., in chat data 126). For example, stored data can be utilized to train a bot for future use. In another aspect, chat management program 200 captures and stores the effect of the customized messages in the chat discourse (e.g., effect of reply 340 on user A). Chat management program 200 can store the net effect on emotional information associated with the message/reply, the corresponding user, an associated user category, a discussion topic, etc.

FIG. 3 depicts example chat session 300 between the user of computing device 110 (i.e., user A) and a chatbot (managed/operated by server 120), in accordance with various embodiments of the present invention. Example chat session 300 depicts a sample interaction between user A and a chatbot, which includes message 310, message 330, and message 350 from user A, and reply 320 and reply 340 from the chatbot.

In additional aspects, example chat session 300 includes emotional information 370, which includes emotion levels 315, emotion levels 335, and emotion levels 355. Emotion information 370 can be illustrative of information that chat management program 200 determines during operation, but does not present to user A (i.e., background data for use in processing), in accordance with embodiments of the present invention. In example embodiments, chat management program 200 determines real-time emotion information for the chat discourse between user A and the chatbot. For example, emotion levels 315 corresponds to message 310, emotion levels 335 corresponds to message 330, and emotion levels 355 corresponds to message 350.

Figure 4:
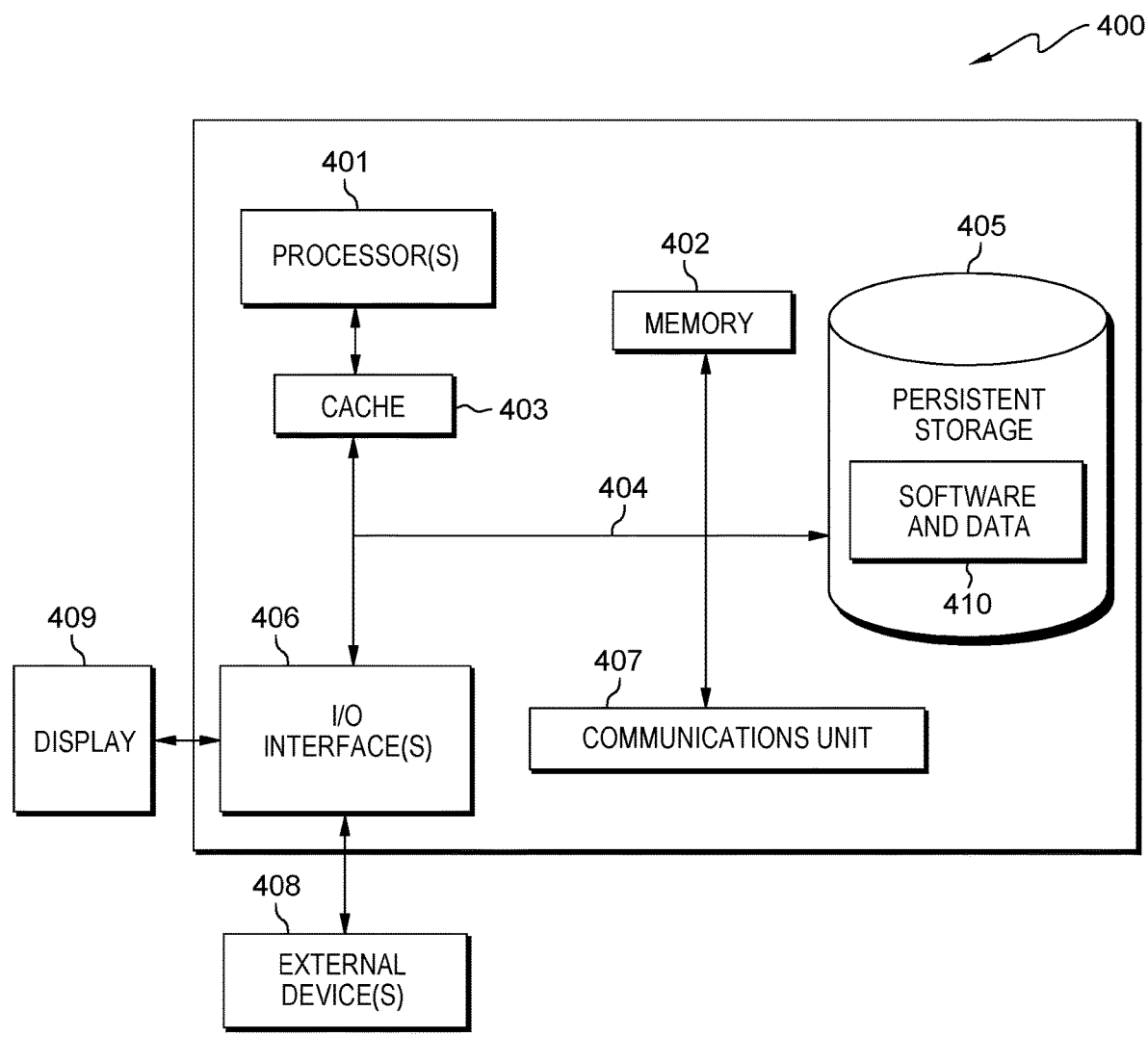
FIG. 4 depicts a block diagram of components of a computing system representative of the computing device and authentication device of FIG. 1, in accordance with an embodiment of the present invention.

FIG. 4 depicts computer system 400, which is representative of computing device 110 and server 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to computing device 110, software and data 410 includes user interface 112 and application 114. With respect to server 120, software and data 410 includes chat management program 200, user data 124, and chat data 126.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
identifying, by one or more processors, user profile data associated with a user engaged in a real-time chat discourse with a chatbot;
analyzing, by one or more processors, the real-time chat discourse between the user and the chatbot;
determining, by one or more processors, a baseline emotive level for the real-time chat discourse based on the user profile data and the analysis of the real-time chat discourse;
determining, by one or more processors, real-time emotion information of messages of the user in the real-time chat discourse;
determining, by one or more processors, whether the real-time emotion information deviates from the determined baseline emotive level;
responsive to determining that the real-time emotion information deviates from the determined baseline emotive level, identifying, by one or more processors, an emotion category in the real-time emotion information that has deviated from the baseline emotive level;
identifying, by one or more processors, one or more message segments that are associated with improving the identified emotion category; and
generating, by one or more processors, the chat message to include the identified one or more message segments to improve the identified emotion category that has deviated from the baseline emotive level.

2. The method of claim 1, further comprising:
sending, by one or more processors, the generated message to the user in the real-time chat discourse.

3. The method of claim 1, wherein generating the chat message further comprises:
identifying, by one or more processors, an emotion category that has deviated from the baseline emotive level, wherein the baseline emotive level for the real-time chat and the real-time emotion information of messages of the user in the real-time chat discourse are a numerical score;
identifying, by one or more processors, one or more message segments that are associated with improving the identified emotion category; and
generating, by one or more processors, the chat message to include the identified one or more message segments.

4. The method of claim 1, wherein the real-time emotion information includes respective scores for a plurality of emotion categories, based on a linguistic analysis of a message from the user in the chat discourse.

5. The method of claim 1, wherein the baseline emotion level is a set of emotion information associated with a previous message form the user in the chat discourse.

6. The method of claim 1, wherein determining whether the real-time emotion information deviates from the determined baseline emotive level occurs utilizing a threshold distance value to determine whether the real-time emotion information deviates from the determined baseline emotive level.

7. The method of claim 1, wherein determining whether the real-time emotion information deviates from the determined baseline emotive level use a percentage value of a threshold distance value to determine if the real-time emotion information deviates from the determined baseline emotive level.

8. The method of claim 1, wherein identifying one or more words that are associated with improving the identified emotion category further comprises generating, by one or more processors, the message using the one or more words to mitigate negative trends in one or more of an emotion category.

9. The method of claim 1, wherein determining whether the real-time emotion information deviates from the determined baseline emotive level includes an assigned threshold distance value on a topic of a plurality of topics in the chat discourse, wherein the assigned threshold distance value is different for one or more topics of the plurality of topics.

10. A computer program product comprising:
one or more computer readable storage media and program instructions stored on the one or more computer readable storage media, the program instructions comprising:
program instructions to identify user profile data associated with a user engaged in a real-time chat discourse with a chatbot;
program instructions to analyze the real-time chat discourse between the user and the chatbot;
program instructions to determine a baseline emotive level for the real-time chat discourse based on the user profile data and the analysis of the real-time chat discourse;
program instructions to determine real-time emotion information of messages of the user in the real-time chat discourse;
program instructions to determining, by one or more processors, whether the real-time emotion information deviates from the determined baseline emotive level;
responsive to determining that the real-time emotion information deviates from the determined baseline emotive level, program instructions to identify an emotion category in the real-time emotion information that has deviated from the baseline emotive level;
program instructions to identify one or more words that are associated with improving the identified emotion category; and
program instructions to generate the chat message to include the identified one or more words to improve the identified emotion category that has deviated from the baseline emotive level.

11. The computer program product of claim 10, further comprising program instructions, stored on the one or more computer readable storage media, to:
   send the generated message to the user in the real-time chat discourse.

12. The computer program product of claim 10, wherein the program instructions to generate the chat message further comprise program instructions to:
   identify an emotion category that has deviated from the baseline emotive level, wherein the baseline emotive level for the real-time chat and the real-time emotion information of messages of the user in the real-time chat discourse are a numerical score;
   identify one or more message segments that are associated with improving the identified emotion category; and
   generate the chat message to include the identified one or more message segments.

13. The computer program product of claim 10, wherein the baseline emotion level is a set of emotion information associated with a previous message form the user in the chat discourse.

14. The computer program product of claim 10, wherein the program instructions to generate the chat message further comprise program instructions to:
   in response to determining that the real-time emotion information does not deviate from the determined baseline emotive level, determine whether the chat discourse ends; and
   in response to determining that the chat discourse does not end, determine an updated set of emotion information corresponding to a new message in the chat discourse from the user.

15. A computer system comprising:
   one or more computer processors;
   one or more computer readable storage media; and
   program instructions stored on the computer readable storage media for execution by at least one of the one or more processors, the program instructions comprising:
   program instructions to identify user profile data associated with a user engaged in a real-time chat discourse with a chatbot;
   program instructions to analyze the real-time chat discourse between the user and the chatbot;
   program instructions to determine a baseline emotive level for the real-time chat discourse based on the user profile data and the analysis of the real-time chat discourse;
   program instructions to determine real-time emotion information of messages of the user in the real-time chat discourse;
   program instructions to determining, by one or more processors, whether the real-time emotion information deviates from the determined baseline emotive level;
   responsive to determining that the real-time emotion information deviates from the determined baseline emotive level, program instructions to identify an emotion category in the real-time emotion information that has deviated from the baseline emotive level;
   program instructions to identify one or more words that are associated with improving the identified emotion category; and
   program instructions to generate the chat message to include the identified one or more words to improve the identified emotion category that has deviated from the baseline emotive level.

16. The computer system of claim 15, further comprising program instructions, stored on the computer readable storage media for execution by at least one of the one or more processors, to:
   send the generated message to the user in the real-time chat discourse.

17. The computer system of claim 15, wherein the program instructions to generate the chat message further comprise program instructions to:
   identify an emotion category that has deviated from the baseline emotive level, wherein the baseline emotive level for the real-time chat and the real-time emotion information of messages of the user in the real-time chat discourse are a numerical score;
   identify one or more message segments that are associated with improving the identified emotion category; and
   generate the chat message to include the identified one or more message segments.

18. The computer system of claim 15, wherein the real-time emotion information includes respective scores for a plurality of emotion categories, based on a linguistic analysis of a message from the user in the chat discourse.

19. The computer system of claim 15, wherein the baseline emotion level is a set of emotion information associated with a previous message form the user in the chat discourse.

20. The computer system of claim 15, further comprising program instructions, stored on the computer readable storage media for execution by at least one of the one or more processors, to:
   in response to determining that the real-time emotion information does not deviate from the determined baseline emotive level, determining, by one or more processors, whether the chat discourse ends; and
   in response to determining that the chat discourse does not end, determining, by one or more processors, an updated set of emotion information corresponding to a new message in the chat discourse from the user.

* * * * *